3,171,825
NOVEL POLYMERIZED COMPOSITIONS OF A WAX, HYDROCARBON POLYMER AND A POLYMERIC POLAR ORGANIC COMPOUND
Herman Francis Mark, Brooklyn, N.Y., assignor to The Western Petrochemical Corporation, New York, N.Y., a corporation of Delaware
No Drawing. Filed June 11, 1959, Ser. No. 819,542
12 Claims. (Cl. 260—28.5)

This invention is directed to novel compositions of matter made from hydrocarbon waxes. These novel compositions are particularly useful in treating surfaces, in general, for providing various effects and, in particular, as protective coatings on solid substrates, especially such polar substrates as metals, ceramics, cellulosics and protein material.

There were known heretofore many wax-containing materials which had been used in the treatment of surfaces for providing protection against abrasion and the action of water. The heretofore known wax-containing materials were mainly blends containing waxes as the major ingredient and smaller amounts of additives for providing special effects. Wax materials of this type are particularly unsuited for wide general use because of the lack of certain necessary properties such as hardness, toughness, adhesion to the substrate, resistance to solvent and, particularly, resistance to selective solvent extraction. Some of the heretofore known wax materials containing various additives were also subject, over a period of time, to separation into their various components.

It is therefore an object of the present invention to provide novel compositions which can be applied to solid surfaces, and when once applied, adhere tenaciously to said surfaces to render them resistant to water in any form, including aqueous solutions, suspensions and emulsions.

Another object is to provide compositions which when applied to solid surfaces give coatings that are extremely hard and tough so as to resist scratching and chipping under impacts, particularly, at such low temperatures as are encountered inside deep-freeze units.

Another object of this invention is to provide compositions which when applied are resistant to solvents and, especially, selective solvent extraction.

Still another object of this invention is to provide compositions made from wax and other components and which remain homogeneous and do not separate into the various components employed in making the compositions.

The novel compositions of this invention comprise a polymerized blend comprised of in combination a hydrocarbon wax, a hydrocarbon polymer and a polymeric, organic, polar compound. The hydrocarbon wax employed in making the novel compositions has a molecular weight in the range from 150 to 5,000, and preferably from 400 to 1500, and melting points in the range from 0 to 200° C., preferably from 40 to 150° C. The hydrocarbon polymer employed in making the novel compositions has a molecular weight of at least 10,000, preferably 15,000, and is compatible, with or without the aid of solvents, with the wax. Hydrocarbon polymers having molecular weights as high as 1,000,000, or preferably 60,000, are suitable so long as they are compatible, with or without the aid of solvents, with the hydrocarbon wax. Suitable hydrocarbon polymers are those which melt at temperatures within the range of −30 to 180° C. and preferably 80 to 120° C. The polymeric, organic, polar compound employed in preparing the novel compositions has a molecular weight in the range from 400 to 75,000, preferably from 800 to 60,000.

The novel compositions are prepared by forming a homogeneous mixture of the hydrocarbon wax, the hydrocarbon polymer and the polar compound, and subjecting the resulting homogeneous mixture to polymerizing conditions. The amount of hydrocarbon wax employed is in the range from 50 to 93 weight percent, preferably 80 to 91 weight percent; the amount of hydrocarbon polymer employed is in the range from 5 to 50 weight percent, preferably 8 to 40 weight percent; and the amount of polar compound employed is not greater than 10 weight percent, and preferably from 0.5 to 3 weight percent, all weight percents being based on the aggregate weights of hydrocarbon wax, hydrocarbon polymer and polar compound employed.

The hydrocarbon wax is a low molecular weight compound of aliphatic, cycloaliphatic and/or aromatic nature. Such waxes are essentially comprised of carbon and hydrogen, but also can contain small amounts of combined nitrogen and oxygen, usually in amounts less than 4 weight percent. Illustrations of typical hydrocarbon waxes are the microcrystalline waxes, the Fischer-Tropsch waxes, tank bottom waxes.

The hydrocarbon polymers suitable for preparing the compositions are of the high molecular weight type and are essentially comprised of carbon and hydrogen, but also can contain small amounts of combined nitrogen and/or oxygen, usually in amounts less than 4 weight per cent. Illustrations of typical hydrocarbon polymers are polythylene, polypropylene, polyisobutylene, polystyrene and polybutadiene. The term "polymer" is used herein in its generic sense to include copolymers as well as polymers containing only one type of repeating unit.

The polymeric, organic, polar compounds employed in this invention are polymers which contain polar groups of the type which contain oxygen and/or nitrogen. Illustrative polar compounds which are used in this invention are epoxy resins, e.g., the diglycidyl ethers of polyhydric phenols, polyesters, e.g., maleic anhydride-ethylene glycol polycondensates, polyurethanes, e.g., propylene glycol-2-,4-tolylene diisocyanate polymers, polyacrylates, e.g., poly(butyl acrylates), and polyvinyl alkanoates, e.g., poly(vinyl acetates).

In more detail, the method for making the novel compositions is carried out by intimately mixing the hydrocarbon wax, the hydrocarbon polymer and the polar compound, preferably by bringing them to a temperature at which they are all in the liquid state and then exposing them to a strong prolonged shearing action. The liquid state is obtained simply by heating the components to a temperature at which the highest melting component melts. The shearing action is achieved by introducing the liquid components into an extruder, onto heated rolls, into a dough mixer, or into an intensive blender or by any other suitable means for developing strong shearing action.

After the components are put into the liquid state and mixed as described above, there results a homogeneous mass which is soft and sticky at temperatures above ordinary temepratures. Upon cooling the mass to room temperature, it becomes hard and tough. When the homogeneous mass is coated on metals, glass, leather, paper or fabric, coatings obtained thereby undergo changes in properties with the passage of time because of separation or demixing of the various components. Demixing of the coatings and the resulting changes in properties prevents their practical use. In order to demonstrate the undesirable property of demixing possessed by the simple homogeneous mixtures, the polar compound can be leached out of the mixture in substantially quantitative yield by treating a layer of the mixture with methanol, acetone or other liquids in which the polar compound is normally soluble and in which the other two components are normally insoluble. After extraction of the polar compound, the wax can be leached out by treating a layer of the mixture with heptane or other suitable solvent which normally dissolves the wax but not the hydrocarbon polymer.

After preparing the homogeneous mixture of hydrocarbon wax, hydrocarbon polymer and polar compound, the mixture is subjected to polymerizing conditions which produce the novel compositions. Illustrative of polymerizing conditions which can be applied to the homogeneous mixture are irradiation with activating radiations, activation by a catalyst or cross-linking agent or by any other suitable means. In greater detail, the homogeneous mixture is subjected to activating radiations having wave lengths between 2,000 and 5,000 Angstrom units, preferably between 3,000 and 4,000 Angstrom units, such as the radiations of ultraviolet light and gamma-radiations. Alternatively, a catalyst or cross-linking agent such as the peroxides or azo compounds is mixed with the homogeneous mixture in amounts between 0.01 and 10 weight percent, preferably between 0.1 and 0.6 weight percent. Other polymerizing agents or polymerizing conditions are also employed in treating the homogeneous mixtures to obtain the novel compositions.

After applying polymerizing conditions to the homogeneous mixture, the novel compositions thus produced are stable to any tendency to separate over the passage of time. They also resist the selective extraction which the homogeneous mixture prior to polymerization undergoes. For example, treatment of films made from the novel compositions with methanol, acetone or other such solvents removes only an insignificant amount, if any at all, of the polar compound. Treatment of films made from the novel compositions with heptane or other hydrocarbon solvents does not leach out more than 5 or 10% of the hydrocarbon wax. Higher boiling keton esters or ethers fail to dissolve films made from the novel compositions and only slightly swell such films.

The compositions of this invention are especially useful in making films or coatings which are of superior strength, hardness and toughness, and which adhere tenaciously to solid polar substrates. Such films or coatings are substantially insoluble in and impermeable to such liquids as water. Coatings made from the novel compositions resist scratching and chipping under a wide range of severe service conditions; for example, impacts at low temperatures.

The following examples are presented.

*Example I*

100 parts of a microcrystalline wax with an approximate molecular weight of 400 and a melting point of 48° C. were placed in an autoclave and heated to 125° C. to form a moderately viscous melt. The melt was kept agitated by a stirrer turning at about 100 r.p.m. and a solution of 18 parts of polyethylene in 60 parts of xylene was added. This solution was prepared by dissolving polyethylene of a molecular weight of about 22,000 and a melting point of 110° C. in xylene at 100° C.; it was added to the agitated melt at 125° C. The wax was also soluble in xylene at that temperature and a homogeneous, moderately viscous mixture was obtained. Stirring was continued during and after the incorporation of the polyethylene-xylene solution. Ten minutes after the addition of the polymer 2.8 parts of an epoxy resin were added. The epoxy resin is a diglycidyl ether of bisphenol A (i.e., bis[4-hydroxyphenyl]-2,2-propane), formed by the well-known reaction of epichlorohydrin and bisphenol A in the presence of an alkali, having an average molecular weight of 800. The resin went into solution within a very short time and did not change the appearance of the material in the autoclave. The agitation was continued for 15 more minutes after which time 0.2 part of dicumene peroxide dissolved in 10 parts of xylene were added to the autoclave. Five minutes after the incorporation of the peroxide, the autoclave was connected to a vacuum pump and the xylene was distilled into a recipient; 65 parts of the 70 parts of the xylene added to the autoclave were recovered by this vacuum distillation. The contents of the vessel, a viscous mass at 110° C., was poured into a flat pan and slowly cooled down to room temperature. A hard, tough, waxy composition which starts to soften at about 50° C. and is moderately viscous above 100° C. was obtained. This composition is coated on various substrates including paper, cardboard, fabrics, wood, leather or synthetic plastics either from a solution or from the melt by spraying, casting or calendering. It forms colorless, translucent, tough coatings which adhere strongly to the substrate, have a good surface hardness, provide excellent water repellency and are superior in flexing tests. These properties of the new composition are distinctly superior to those of the presently available waxes.

*Example II*

Five pounds of a tank bottom wax having a molecular weight of about 800 and a melting point of 80° C. were placed in a pressure vessel and heated to 135° C. There resulted a relatively fluid melt which was kept agitated with a stirrer rotating at about 100 r.p.m. To this melt was added a solution of isotactic polypropylene in xylene prepared by dissolving 0.5 lb. of isotactic polypropylene having a molecular weight around 18,000 and a melting point of 165° C. in 2 lbs. of xylene. The 18,000 molecular weight polypropylene was obtained by melting isotactic polypropylene having a molecular weight of about 80,000 in the presence of 0.1 to 0.5% of an inorganic or organic peroxide or hydroperoxide and keeping it at a temperature between 180° and 220° C. for a period between twenty minutes and two hours. The polypropylene melt was kept in moderate agitation by stirring or shaking. Depending on the concentration of catalyst, temperature and time, a certain degree of degradation was reached which was controlled by the proper choice of these three factors. Other methods for degrading polypropylene employ nitro-, nitroso- or azo-compounds instead of degradation catalysts of peroxidic character.

After addition of the polypropylene-xylene solution, the system in the kettle represented a rather fluid, somewhat sticky mass, the temperature of which was lowered to 120° C. without an appreciable increase of viscosity. The contents of the reactor were maintained at that temperature in mild agitation for fifteen minutes, after which time 20 gr. of polyvinylacetate of medium viscosity and molecular weight of about 35,000 dissolved in 100 gr. of methylethylketone were added. The incorporation of polyvinylacetate produced no visible change in the content of the kettle since all components were compatible with each other at the temperature of 120° C. After another period of 15 minutes, the mixture was exposed to a vacuum and the xylene and MEK were distilled off. The content was then poured into a cardboard container and slowly cooled down to room temperature, whereupon it became a hard, somewhat brittle, waxy mass. The cardboard container was then placed in a $Co^{60}$ oven and exposed to the gamma radiation of this isotope until it had been exposed to a total dose of 850,000 reps. The result of this treatment was a noticeable hardening of the composition together with an increase of the melting point and of the melt viscosity. The composition (in which the three different components are now chemically combined with each other) is used to coat paper, woody cardboard, fabrics, glass or metal from the melt or from a solution or emulsion, whereupon it forms hard, tough, strongly adhering and water impermeable coatings greatly superior to those obtained from conventional waxes or wax-polymer blends.

*Example III*

400 gr. of a Fischer-Tropsch Wax with an average molecular weight of 800 and with a melting range from 55–65° C. were put into a stainless steel kettle of 4 liters volume and were heated to 110° C. to form a melt. The melt was stirred and 55 gr. of polystyrene dissolved in 250 ml. of toluene were added. The polystyrene had a molecular weight of 40,000 and a melting point of about 90° C. and was dissolved in the toluene at 80° C. After the addition of the polystyrene-toluene mixture, the system in the kettle was brought back to 110° C. and was stirred for 20 minutes. At this time, a solution of 12 gr. of a polyester dissolved in 30 ml. of methylethylketone was added to the kettle. The polyester had been prepared by condensation of a mixture of ethylene glycol and propylene glycol (1 mole ethylene glycol to 2 moles of propylene glycol) with a mixture of adipic acid and maleic acid (1.5 moles adipic acid to 1.2 moles of maleic acid) in such a manner that the two glycol components represented a 20% stoichiometric excess of reactive groups over the two acid components. The average molecular weight of this polyester was about 800. The addition of the polyester did not produce any change in the character of the reaction mixture in the kettle. After another 10 minutes of gentle stirring, a solution of 0.6 gr. of bis-azo-isobutyronitril dissolved in 10 ml. of toluene was incorporated. Five minutes later the reaction vessel was connected with a vacuum system and the volatile components of the mixture (toluene and methylethylketone) were distilled off. The composition in the kettle represents a viscous, sticky mass which solidified as soon as it was cooled down to room temperature. The composition was a waxy material which was hard to the touch at 20° C. and was soluble in hydrocarbons, ketones, esters and chlorinated hydrocarbons. The composition is coated on such substrates as metals, glass, ceramics, wood, cardboard, paper, cellophane, fabrics and leather either from the melt or from a solution, emulsion or suspension. The coatings produced in this way adhere tenaciously to the substrate, have a high resistance against scratching and scuffing and are highly impermeable against water both in the liquid and in the vapor phase.

*Example IV*

150 lbs. of a fully refined microcrystalline wax with a molecular weight of about 600 and a melting point of around 80° C. were placed in a 60 gallon kettle and heated to 120° C. There resulted a viscous melt which was gently agitated by a stirrer and kept at a constant temperature of 110° C. To this melt was added a solution of 25 lbs. of GR-S rubber having a molecular weight of about 70,000 and a melting point of about 35° C. in 20 gallons of toluene; this solution also contained 2.5 lbs. of polybutylacrylate of a molecular weight of 60,000. The addition was carried out under such conditions that the temperature of the kettle contents remained permanently between 100 and 110° C. and the stirrer (turning at about 100 r.p.m.) continued to agitate the mixture. After 45 minutes of mixing, the kettle contents were practically homogenized and there was added 0.75 lb. of dilauroyl peroxide dissolved in 0.5 gallon of toluene. Ten minutes after this addition, the kettle was connected with a vacuum system and the toluene was distilled off while the temperature was kept at 110° C. During this operation the viscosity of the mass increased gradually and the rate of stirring was decreased from 100 r.p.m. to 50 r.p.m. As soon as substantially all the toluene was removed, the viscous mass was poured into a pan and cooled down to 25° C. There was obtained a hard, tough, waxy composition which began to soften at 70° C. and was completely converted into a sticky melt at about 90° C. The composition is readily deposited on solid surfaces such as metals, ceramics, glass, wood, cardboard, paper, celloplane, fabrics of all kinds and leather either from the melt or from solution, emulsion or suspension and provides a smooth, hard coating which adheres strongly to the surface and shows exceptionally good behavior in flexing and abrasion.

It is intended that the specific examples set forth herein are to be considered illustrative rather than limiting, and it is further intended to cover all modifications and embodiments that fall within the spirit and scope of the appended claims.

What is claimed is:

1. A new composition of matter comprising a polymerized blend consisting essentially of, in combination, (A) 50 to 93 weight percent of hydrocarbon wax having a molecular weight from 150 to 5,000; (B) 5 to 50 weight percent of a hydrocarbon polymer compatible with said wax and having a molecular weight of at least 10,000 but not more than 1,000,000 and melting at temperatures in the range of about −30° C. to about 180° C., and (C) a polymeric, organic, polar compound having a molecular weight of 400 to 75,000, said polymeric, organic, polar compound being present in an amount of not more than 10 weight percent, said compound being from the class consisting of epoxy resins, polyester polycondensates and polyurethanes; the weight percents being based on the aggregate weight of (A), (B), and (C), said blend being polymerized in the presence of a member from the class consisting of polymerizing irradiations, peroxide catalysts and azo catalysts.

2. A new composition of matter comprising a polymerized blend consisting essentially of, in combination, (A) 60 to 91 weight percent of hydrocarbon wax having a molecular weight from 400 to 1,500; (B) 8 to 40 weight percent of a hydrocarbon polymer compatible with said wax and having a molecular weight of at least 15,000 but not more than 1,000,000 and melting at temperatures in the range of about −30° C. to about 180° C., and (C) 0.5 to 3 weight percent of a polymeric, organic, polar compound having a molecular weight of 800 to 60,000, said compound being from the class consisting of epoxy resins, polyester polycondensates, and polyurethanes; the weight percents being based on the aggregate weight of (A), (B), and (C), said blend being polymerized in the presence of a member from the class consisting of polymerizing irradiations, peroxide catalysts and azo catalysts.

3. A new composition of matter comprising a polymerized blend consisting essentially of, in combination, (A) 50 to 93 weight percent of microcrystalline wax having a molecular weight from 150 to 5,000; (B) 5 to 50 weight percent of a polyethylene compatible with said wax and having a molecular weight of at least 10,000; and (C) a reaction product of epichlorohydrin and bis-(4 - hydroxy-phenyl)-2,2-propane having a molecular weight of about 800, said diglycidyl ether being present in an amount of not more than 10 weight percent; the weight percents being based on the aggregate weight of (A), (B), and (C), said blend being polymerized in the presence of a member from the class consisting of polymerizing irradiations, peroxide catalysts and azo catalysts.

4. A new composition of matter comprising a polymerized blend consisting essentially of, in combination, (A) 50 to 93 weight percent of tank bottom wax having a molecular weight from 150 to 5,000; (B) 5 to 50 weight percent of a polypropylene compatible with said wax and having a molecular weight of at least 10,000; and (C) a polyvinylacetate having a molecular weight from 400 to 75,000, said polyvinylacetate being present in an amount of not more than 10 weight percent; the weight percents being based on the aggregate weight of (A), (B), and (C), said blend being polymerized in the presence of a member from the class consisting of polymerizing irradiations, peroxide catalysts and azo catalysts.

5. A new composition of matter comprising a polymerized blend consisting essentially of, in combination, (A) 50 to 93 weight percent of Fischer-Tropsch wax having a molecular weight from 150 to 5,000; (B) 5 to 50 weight percent of a polystyrene compatible with said wax and having a molecular weight of at least 10,000; and (C) a polyesters polycondensate having a molecular weight from 400 to 75,000, said polycondensate being present in an amount of not more than 10 weight percent; the weight percents being based on the aggregate weight of (A), (B), and (C), said blend being polymerized in the presence of a member from the class consisting of polymerizing irradiations, peroxide catalysts and azo catalysts.

6. A new composition of matter comprising a polymerized blend consisting essentially of, in combination, (A) 50 to 90 weight percent of microcrystalline wax having a molecular weight from 150 to 5,000; (B) 5 to 50 weight percent of a butadiene-styrene synthetic rubber compatible with said wax and having a molecular weight of at least 10,000; and (C) a polybutylacrylate having a molecular weight from 400 to 75,000, said synthetic rubber being present in an amount of not more than 10 weight percent; the weight percents being based on the aggregate weight of (A), (B), and (C), said blend being polymerized in the presence of a member from the class consisting of polymerizing irradiations, peroxide catalysts and azo catalysts.

7. The method of preparing a novel composition of matter for use in providing strong, hard, tough, adherent coatings, comprising the steps of, mixing (A) 50 to 93 weight percent of hydrocarbon wax having a molecular weight from 150 to 5,000; (B) 5 to 50 weight percent of a hydrocarbon polymer compatible with said wax and having a molecular weight of at least 10,000 but not more than 1,000,000 and melting at temperatures in the range of about −30° C. to about 180° C.; and (C) a polymeric, organic, polar compound having a molecular weight of 400 to 75,000, said polymeric, organic, polar compound being present in an amount of not more than 10 weight percent, said compound being from the class consisting of epoxy resins, polyester polycondensates, and polyurethanes, said weight percents being based on the aggregate weight of (A), (B) and (C); subjecting the resulting mixture to prolonged shearing action to obtain an intimate, homogeneous mixture; and polymerizing said intimate, homogeneous mixture, said polymerizing step being carried out in the presence of a member from the class consisting of polymerizing irradiations, peroxide catalysts and azo catalysts.

8. The process claimed in claim 7 wherein the hydrocarbon polymer is polyethylene.

9. The process claimed in claim 7 wherein the hydrocarbon polymer is polyethylene, the wax is a microcrystalline wax and the polymeric, organic, polar compound is a reaction product of epichlorhydrin and bis-(4-hydroxyphenyl)2,2-propane.

10. The process claimed in claim 7 wherein the hydrocarbon polymer is polypropylene, the wax is tank bottom wax and the polymeric, organic, polar compound is polyvinyl acetate.

11. The process claimed in claim 7 wherein the hydrocarbon polymer is polystyrene, the wax is Fischer-Tropsch wax and the polymeric, organic, polar compound is a polyester polycondensate.

12. The process claimed in claim 7 wherein the hydrocarbon polymer is butadiene-styrene synthetic rubber, the wax is a microcrystalline wax and the polymeric, organic, polar compound is a polybutylacrylate.

References Cited in the file of this patent

UNITED STATES PATENTS

| | | |
|---|---|---|
| 2,051,944 | Hershberger | Aug. 25, 1936 |
| 2,413,239 | Manson | Dec. 24, 1946 |
| 2,612,480 | May | Sept. 30, 1952 |
| 2,617,782 | Paton et al. | Nov. 11, 1952 |
| 2,639,275 | Vickers et al. | May 19, 1953 |
| 2,750,302 | Camarda et al. | June 12, 1956 |
| 2,797,203 | Barber et al. | June 25, 1957 |
| 2,879,241 | De Groote et al. | Mar. 24, 1959 |

FOREIGN PATENTS

| | | |
|---|---|---|
| 529,399 | Great Britain | Nov. 20, 1940 |
| 598,055 | Great Britain | Feb. 10, 1948 |